United States Patent
Dou

(10) Patent No.: US 9,946,770 B2
(45) Date of Patent: Apr. 17, 2018

(54) METHOD, DEVICE, AND SYSTEM FOR SEARCHING KEY WORDS

(71) Applicant: Tencent Technology (Shenzhen) Company Limited, Shenzhen (CN)

(72) Inventor: Ningjun Dou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 699 days.

(21) Appl. No.: 14/490,428

(22) Filed: Sep. 18, 2014

(65) Prior Publication Data

US 2015/0019546 A1   Jan. 15, 2015

Related U.S. Application Data

(63) Continuation of application No. PCT/CN2014/073597, filed on Mar. 18, 2014.

(30) Foreign Application Priority Data

Jun. 4, 2013   (CN) .......................... 2013 1 0219143

(51) Int. Cl.
  *G06F 7/00*   (2006.01)
  *G06F 17/30*   (2006.01)
  *G06F 17/00*   (2006.01)

(52) U.S. Cl.
  CPC .. *G06F 17/30554* (2013.01); *G06F 17/30887* (2013.01)

(58) Field of Classification Search
  CPC ................ G06F 17/30554; G06F 17/30887
  See application file for complete search history.

(56) References Cited

U.S. PATENT DOCUMENTS

| | | | | |
|---|---|---|---|---|
| 2001/0044800 | A1* | 11/2001 | Han | ................. G06F 17/30864 707/999.01 |
| 2008/0059521 | A1* | 3/2008 | Hutson | ............. G06F 17/30873 707/999.107 |
| 2010/0153427 | A1* | 6/2010 | Schechter | ......... G06F 17/30864 707/768 |
| 2013/0006956 | A1 | 1/2013 | Li et al. | |

FOREIGN PATENT DOCUMENTS

| | | |
|---|---|---|
| CN | 101067815 A | 11/2007 |
| CN | 101118555 A | 2/2008 |
| CN | 101201838 A | 6/2008 |
| CN | 101546328 A | 9/2009 |
| CN | 102306171 A | 1/2012 |
| CN | 102436448 A | 5/2012 |

OTHER PUBLICATIONS

International Search Report and Written Opinion dated Jun. 30, 2014 for International Application No. PCT/CN2014/073597, 7 pages.
Office Action dated Sep. 12, 2017 for Chinese Application No. 201310219143.7, 7 pages.

* cited by examiner

*Primary Examiner* — Kannan Shanmugasundaram
(74) *Attorney, Agent, or Firm* — Brinks Gilson & Lione

(57) ABSTRACT

A method and system for searching key words are provided. The method includes: acquire key words typed in the search box, and based on the key words, a search request is sent; associated words which are found based on the search request as well as a summary of the results relevant to the associated words are sent back; the associated words and the summary of the results relevant to the associated words are displayed respectively in the list corresponding to the search box stated previously.

17 Claims, 8 Drawing Sheets

METHOD, DEVICE, AND SYSTEM FOR SEARCHING KEY WORDS

CROSS-REFERENCE TO RELATED APPLICATIONS

This application is a continuation of International Application No. PCT/CN2014/073597, filed on Mar. 18, 2014, which claims priority to Chinese Patent Application No. 201310219143.7, filed Jun. 4, 2013, which are hereby incorporated herein by reference in their entireties.

FIELD

The disclosure involves the applied technology of the Internet, especially a method and system for searching key words.

BACKGROUND

With the development of Internet application, an increasing number of users often perform search through typing key words in a search webpage, and a search is triggered in this way. Specifically speaking, after the search webpage has acquired the key words for searching and the search operation has been triggered, based on the key words typed in for searching, the corresponding associated words are listed. The user clicks a certain key word and then search results related to the key word are shown. Detailed information of search results can be viewed by clicking the search result that the user expects to see.

However, the user can find the expected information in the process of searching key words. In the process, searching key words is realized by typing in key words for several times. In the process, the user's search intention cannot be detected. As a result, the user has to click another search result in order to acquire the expected information. This exerts a negative influence on search efficiency.

SUMMARY

It is necessary to solve the problem that the user's search intention cannot be detected and to improve search efficiency. Therefore, it is essential to develop a search method that can detect the user's search intention and can show the expected information to the user in the process of typing key words. And such an improved method can help with the improvement of search efficiency.

In addition, it is necessary to provide a keyword search system that detects the user's search intention and can show the expected information in the process of typing.

A method for searching key words includes the following steps. A terminal device obtains a key word typed in a search box. The terminal device sends a search request based on the obtained key words. The terminal device obtains associated words based on the search request and obtaining a summary of search results relevant to the associated words. The terminal device displays the associated words and the summary of the results relevant to the associated words respectively in the search box.

The system for searching key words includes one or more hardware processors and non-transitory storage medium accessible to the one or more hardware processors. The non-transitory storage medium is configured to store a plurality of modules that instructs the one or more hardware processor to provide key words in a terminal device. The plurality of modules includes: a Key-word Processing Module configured to receive a key word typed in a search box and to send a search request based on the key word; a Reception Module configured to receive the associated words and a summary of the results relevant to the associated words, wherein the associated words and the summary of the results are both relevant to the search request; and a Display Module configured to display the associated words and the summary of the results relevant to the associated words respectively in a list corresponding to the search box.

The work principle of the method and system for searching key words is stated below: acquire the key words typed in the search box, and based on the key words for searching, a search request is sent; the associated words which are found based on the search request and the summary of the results relevant to the associated words mentioned previously are received; the associated words and the summary of the results relevant to the associated words are respectively displayed in the list corresponding to the search box mentioned previously; therefore, to get the expected information, it is no need for the user to click the associated words which are found based on the key words. And as can be seen from the work principle of the method and system, user's search intention can be detected accurately, and in the process of typing key words for searching, the user's expected information can be shown immediately. Thus, the search efficiency is improved.

DETAILED DESCRIPTION OF THE DRAWINGS

For a better understanding of the aim, technical schemes and advantages of the present disclosure, example embodiments are described in detail in connection with the accompanying drawings as follows.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

Figure 1:
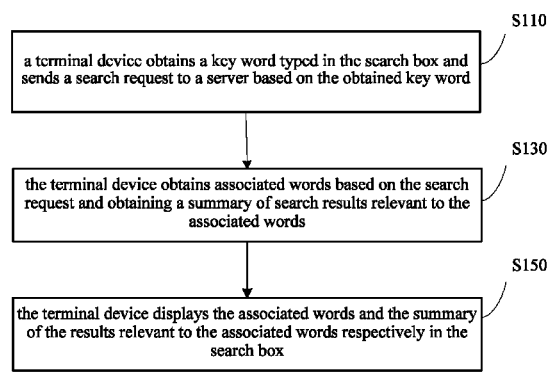
FIG. 1 is a flow chart of the method for searching key words in an embodiment.

As can be seen in the FIG. 1, in the embodiment, the method for searching key words can be implemented through the following steps:

In S110, a terminal device obtains a key word typed in the search box. Based on the key words for searching, the terminal device sends a search request to a server having a hardware processor.

In the embodiment, the key word may include any words and letters typed in the search box. For example, words and letters typed in the search box of a browser. After finishing typing key words and triggering the search, based on the key words typed in, a search request is sent to the background server having a processor.

In S130, the terminal device receives the associated words that are found based on the search request and the summary of the results relevant to the associated. The method steps in FIG. 1 may be implemented in a terminal device or any other computing device.

In the embodiment, associated words refer to words with more semantic meanings that are related to the search key words. For instance, if the key word is "music", the association word can be "music download" and some other words.

The summary of the results relevant to the associated words mentioned previously indicates the summarized information corresponding to a certain search result. The summary of the results relevant to the associated words is extracted from the webpage that displays the search result. The associated words relevant to the key words can be only one or more than one; the summary of the results relevant to the associated words can be a summation of the information which are related to several associated words; or can be a summation of the information which is only about the preferred associated word.

Furthermore, the summary of the results relevant to the associated words is extracted from the webpage that displays the search result; and the webpage is corresponding to the best search result which is related to the preferred associated word. Therefore, the final information acquired through the search can match the user's search intention accurately.

After the background server has selected and acquired the associated words and the summary of the results relevant to the associated words, the background server is back to the search box where the search is triggered.

In S150, the associated words and the summary of the results relevant to the associated words are displayed respectively in the list corresponding to the search box.

In the embodiment, because the associated words and the summary of the results relevant to the associated words are displayed respectively, it is no need for the user to click the associated words and the summary of the results relevant to the associated words if the user wants to view the expected information. This design effectively reduces the complexity of search operation and also helps to avoid mis-operation. As a result, the input effort of portable devices is reduced.

In the method for searching key words introduced above, only by means of typing key words in the search box, the user can acquire the summary of the results relevant to the preferred associated words directly. And the summary of the results relevant to the preferred associated words is displayed in the list corresponding to the search box. Detecting the user's search intention is realized in this way. As a result, in the process of searching expected information, the user does not perform any operation to acquire the expected information. Search efficiency is greatly improved.

Figure 2:
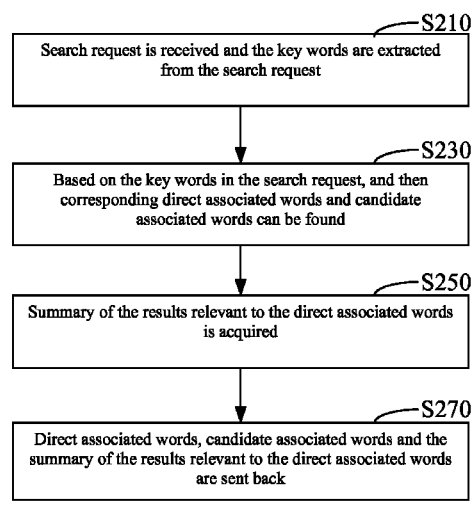
FIG. 2 is a flow chart of the method for searching key words in another embodiment.

As can be seen from the FIG. 2, in the embodiment, the associated words mentioned previously include directly associated words and indirectly associated words. Before the S130 stated above, the method for searching key words is stated below:

In S210, search request is received and the key words are extracted from the search request.

In the embodiment, after the background server receives the search request, the server will extract the key words from the search request.

In S230, based on the key words in the search request, and then corresponding directly associated words and indirectly associated words can be found.

In the embodiment, several associated words have already been saved in the background server. And these associated words will be edited according to the degree of popularity.

Based on the search key words, to acquire the associated words which include the search key words, a matching is made between the search key words with the associated words stored in the background server. The associated words include directly associated words and indirectly associated words. The directly associated words indicate the best words for selection provided for the user's search. The indirectly associated words refer to the other associated words relevant to the search that are different from the directly associated words.

Furthermore, the data library of directly associated words and of indirectly associated words can be set up in the background server. After the key words are extracted from the search request, the key words are searched in the data library of directly associated words in order to acquire the directly associated words that include the key words. The key words are also searched in the data library of indirectly associated words in order to acquire the indirectly associated words which include the key words.

In S250, the summary of the results relevant to the directly associated words is acquired.

In the embodiment, the relation between the directly associated words and the summary of the results relevant to the directly associated words is pre-set. And after the directly associated words are found in by matching, the summary of the results relevant to the directly associated words is acquired.

In S270, the directly associated words, indirectly associated words and the summary of the results relevant to the directly associated words are sent back.

Figure 3:
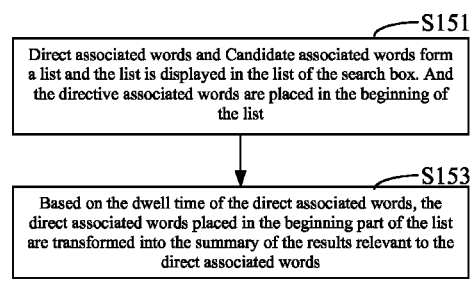
FIG. 3 is a flow chart of the method for displaying the associated words and the summary of the results relevant to the associated words respectively in the list corresponding to the search box.

As can be seen from the FIG. 3, in the embodiment, S150 includes the following steps:

In S151, the directly associated words and the indirectly associated words form a list and the list is displayed in the list of the search box. And the directive associated words are placed in the beginning of the list.

In the embodiment, the directly associated words, the indirectly associated words and the summary of the results relevant to the directly associated words are received. And the directly associated words and the indirectly associated words are displayed in a list corresponding to the search box. For example, in the drop-down list box of the search box, the directly associated words are placed in the beginning of the list.

In S153, based on the dwell time of the directly associated words, the directly associated words placed in the beginning part of the list are transformed into the summary of the results relevant to the directly associated words.

In the embodiment, after the list of the directly associated words and indirectly associated words is displayed, time measurement is triggered, in order to acquire the dwell time of the directly associated words. The dwell time is the time period when the directly associated words are shown in the list. During the dwell time, the directly associated words placed in the beginning part of the list are transformed into the summary of the results relevant to the directly associated words.

Figure 4:
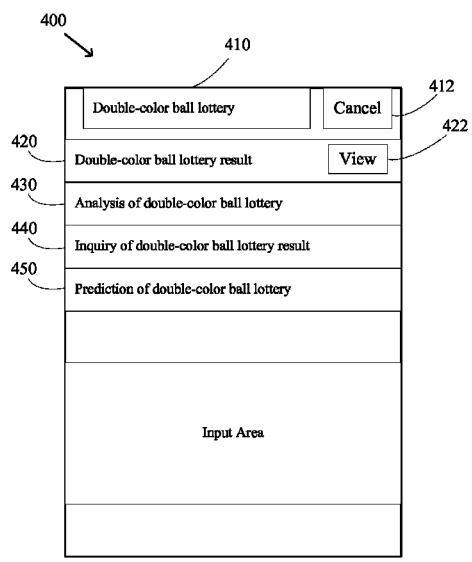
FIG. 4 is a diagram of associated words displayed in the search box in one embodiment.

For example, if the key word typed in the search box is "double-color ball (双色球)", after the search request is sent, based on the key word, matching is made and the direct associated word returned is "the double-color ball lottery result (双色球开奖结果)" and the summary of the results relevant to the directly associated words is also returned. And indirectly associated words such as "the analysis of the double-color ball lottery (双色球走势图)", "inquiry of double-color ball lottery (双色球开奖结果査询)" and "prediction of double-color ball lottery (双色球预测)" are also sent back. This can be seen from FIG. 4.

Figure 5:
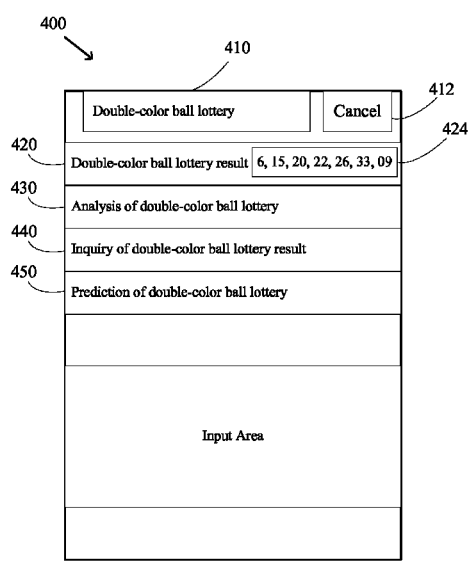
FIG. 5 is a diagram of the summary of the results relevant to the associated words of FIG. 4.

Meanwhile, time measurement starts in order to acquire the dwell time of the directly associated words. And during the dwell time, the directly associated words placed in the beginning part of the list are transformed into the summary of the results relevant to the directly associated words. The summary of the results relevant to the directly associated words here indicates the lottery result of double-color ball lottery (releasing time: 2013034). This can be seen from FIG. 5.

In the method for searching key words introduced above, most of the directly associated words include the most popular associated words that include the key words being searched. Because of this, it is of high possibility that the information which the user expects in the search is related the directly associated words. And through the dwell time, the user's intention can be detected, and then the directly associated words displayed are transformed into the summary of the results relevant to the directly associated words. The summary of the results relevant to the directly associated words is very likely to be the expected information. As a result, the expected information is provided in this intelligent way without any user's operation.

Figure 6:
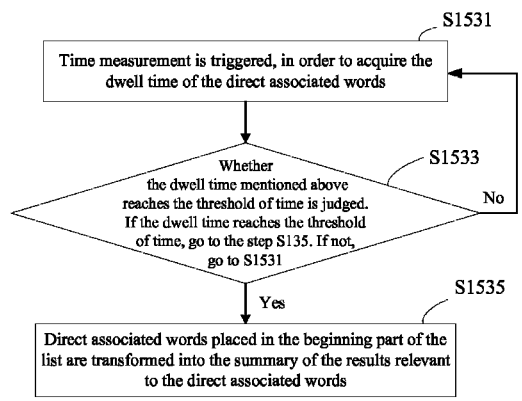
FIG. 6 is a flow chart that based on the dwell time of the directly associated words, the directly associated words displayed in the beginning of the list are transformed into the summary of the results relevant to the directly associated words.

As can be seen in the FIG. 6, in the embodiment, S153 includes the following steps:

In S1531, time measurement is triggered, in order to acquire the dwell time of the directly associated words.

In the embodiment, the directly associated words and the indirectly associated words are displayed in a list corresponding to the search box. And the time measurement is triggered. When any associated words in the list is selected, the selection operation stops the time measurement, in order to acquire the dwell time of the directly associated words.

In S1533, whether the dwell time mentioned above reaches the threshold of time is judged. If the dwell time reaches the threshold of time, go to the step S135. If not, go to S1531.

In the embodiment, the threshold of time can be preset. For instance, the threshold of time can be set as 1 second. The dwell time of the directly associated words usually increases as the time goes on. Therefore, if the increasing dwell time reaches the threshold of time, the directly associated words placed in the beginning part of the list are transformed into the summary of the results relevant to the directly associated words. If not, the time measurement goes on, until it reaches the threshold of time.

In S1535, the directly associated words placed in the beginning part of the list are transformed into the summary of the results relevant to the directly associated words.

In the embodiment, the directly associated words are transformed into the summary of the results relevant to the directly associated words. And then the results relevant to the directly associated words are placed in the beginning of the list.

In another embodiment, after the step S250, there is another step: the URLs of the webpages which include the summary of the results relevant to the directly associated words are acquired and return to the URLs of the webpages which include the summary of the results relevant to the directly associated words.

In the embodiment, after the summary of the results relevant to the directly associated words is acquired, the URLs of the webpages which include the summary of the results relevant to the directly associated words are also acquired. And then return.

Figure 7:
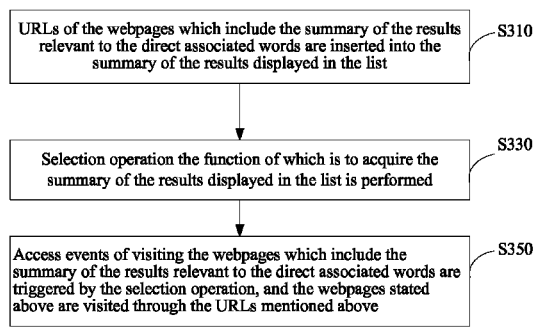
FIG. 7 is a flow chart of the method for searching key words in another embodiment.

As can be seen in the FIG. 7, in another embodiment, after the step S150, the method for searching key words also includes the following steps:

In S310, the URLs of the webpages that include the summary of the results relevant to the directly associated words are inserted into the summary of the results displayed in the list.

In the embodiment, the URLs of the webpages that include the summary of the results relevant to the directly associated words are inserted into the summary of the results displayed in beginning of the list. As a result, the user can visit the webpages that include the summary of the results relevant to the directly associated words by clicking the summary of the results relevant to the directly associated words displayed in the list.

In S330, the selection operation the function of which is to acquire the summary of the results displayed in the list is performed.

In S350, access events of visiting the webpages that include the summary of the results relevant to the directly associated words are triggered by the selection operation, and the webpages stated above are visited through the URLs mentioned above.

Figure 8:
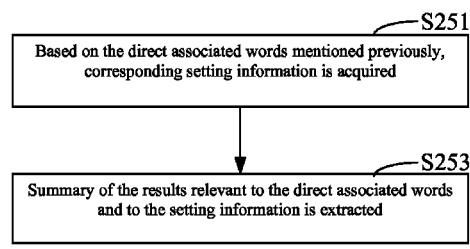
FIG. 8 is a flow chart of the method for acquiring the associated words and the summary of the results relevant to the directly associated words.

As can be seen in the FIG. 8, in the embodiment, the step 250 above also includes the following steps:

In S251, based on the directly associated words mentioned previously, corresponding setting information is acquired.

In the embodiment, considering the fact that the key words typed in might have an ambiguous semantic meaning and that further work needs to be done in order to acquire the accurate summary of the results relevant to the directly associated words, based on the directly associated words corresponding to the directly associated words, corresponding setting information is acquired.

For instance, if the key word typed in is "weather", according to the matching, the direct associated words can be "weather report". Meanwhile, corresponding setting information is acquired. With regard to the area settings, this information is acquired at the first time when the user selects the area. And this information of area can be saved so as that when the key words with an ambiguous semantic meaning is typed in again, the saved information of area can be acquired directly.

In S253, the summary of the results relevant to the directly associated words and to the setting information is extracted.

In the embodiment, the summary of the results relevant to the directly associated words and to the setting information is extracted, so even when key words with an ambiguous semantic meaning are used, the accurate summary of the results relevant to the directly associated words can be found.

Figure 9:
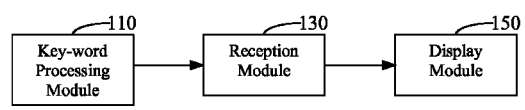
FIG. 9 is a structural diagram of the system for searching key words in an embodiment.

As can be seen in the FIG. 9, in the embodiment, the system for searching key words includes the following modules: Key-word Processing Module 110, Reception Module 130 and Display Module 150.

Key-word Processing Module 110, its function is to acquire key words typed in the search box, and based on the key words, to send a search request.

In the embodiment, the key words indicate any words and letters typed in the search box, for example, words and letters typed in the search box of a browser. After finishing typing key words and triggering the search, based on the key words typed in, a search request is sent to the background server by the Key-word Processing Module 110.

Reception Module 130, the function of which is to receive the associated words and the summary of the results relevant to the associated words, and the associated words and the summary of the results relevant to the associated words are all relevant to the search request.

In the embodiment, associated words refer to words with more semantic meanings that are related to the search key words. For instance, if the key word is "music", the association word can be "music download" and some other words.

The summary of the results relevant to the associated words mentioned previously indicates the summarized information corresponding to a certain search result. The summary of the results relevant to the associated words is extracted from the webpage that displays the search result. The associated words relevant to the key words can be only one or more than one; the summary of the results relevant to the associated words can be a summation of the information which are related to several associated words; or can be a summation of the information which is only about the preferred associated word.

Furthermore, the summary of the results relevant to the associated words is extracted from the webpage that displays the search result; and the webpage is corresponding to the best search result which is related to the preferred associated word. Therefore, the final information acquired through the search can match the user's search intention accurately.

After the background server has selected and acquired the associated words and the summary of the results relevant to the associated words, the background server is back to the search box where the search is triggered.

Display Module 150, the function of which is to display the associated words and the summary of the results relevant to the associated words respectively in the list corresponding to the search box mentioned previously.

In the embodiment, because the associated words and the summary of the results relevant to the associated words are displayed respectively through the Display Module 150, it is no need for the user to click the associated words and the summary of the results relevant to the associated words if the user wants to view the expected information. This design effectively reduces the complexity of search operation and also helps to avoid mis-operation. As a result, the input effort of portable devices is reduced.

In the method for searching key words introduced above, only by means of typing key words in the search box, the user can acquire the summary of the results relevant to the preferred associated words directly. And the summary of the results relevant to the preferred associated words is displayed in the list corresponding to the search box. Detecting the user's search intention is realized in this way. As a result, in the process of searching expected information, the user does not perform any operation to acquire the expected information. Search efficiency is greatly improved.

Figure 10:
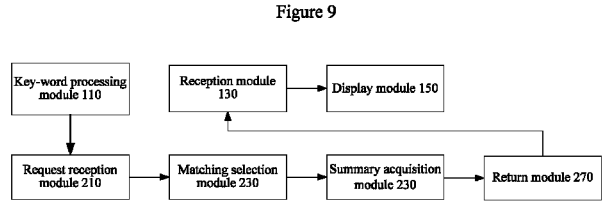
FIG. 10 is a structural diagram of the system for searching key words in another embodiment.

As can be seen from the FIG. 10, in the embodiment, the associated words mentioned previously include directly associated words and indirectly associated words. The system for searching key words also includes Request Reception Module 210, Matching Selection Module 230, Summary Acquisition Module 250 and Return Module 270.

Request Reception Module 210, the function of which is to receive the search request and to extract the key words from the search request.

In the embodiment, after the Request Reception Module 210 receives the search request, it will extract the key words from the search request.

Matching Selection Module 230, it is used to perform matching based on the key words in the search request, and then corresponding directly associated words and indirectly associated words can be found.

In the embodiment, several associated words have already been saved in the background server. And these associated words will be edited according to the degree of popularity.

In the Matching Selection Module 230, based on the search key words, to acquire the associated words which include the search key words, a matching is made between the search key words with the associated words stored in the background server. The associated words include directly associated words and indirectly associated words. The directly associated words indicate the best words for selection provided for the user's search. The indirectly associated words refer to the other associated words relevant to the search which are different from the directly associated words.

Furthermore, the data library of directly associated words and of indirectly associated words can be set up in the background server. After the key words are extracted from the search request in the Matching Selection Module 230, the key words are searched in the data library of directly associated words in order to acquire the directly associated words that include the key words. The key words are also searched in the data library of indirectly associated words in order to acquire the indirectly associated words that include the key words.

Summary Acquisition Module 250, its function is to acquire the summary of the results relevant to the directive associated words.

In the embodiment, the relation between the directly associated words and the summary of the results relevant to the directly associated words is pre-set. And after the directly associated words are found in by matching, the summary of the results relevant to the directly associated words is acquired by the Summary Acquisition Module 250.

Return Module 270, the function of which is to return the directive associated words, the indirectly associated words and the summary of the results relevant to the directive associated words mentioned above.

Request Reception Module 210, Matching Selection Module 230, Summary Acquisition Module 250 and Return Module 270 run in the background server.

Figure 11:
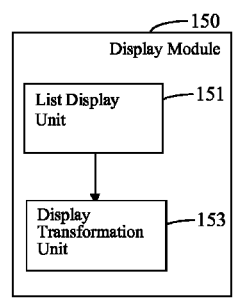
FIG. 11 is a structural diagram of the Display Module in an embodiment.

As can be seen from the FIG. 11, in the embodiment, the Display Module 150 includes the following units: List Display Unit 151 and Display Transformation Unit 153.

List Display Unit 151, its function is to form a list of the directive associated words and the indirectly associated words, and to display these words in the list corresponding to search box, and to display the summary of the results relevant to the directive associated words in the beginning of the list.

In the embodiment, the directly associated words, the indirectly associated words, and the summary of the results relevant to the directly associated words are received by the List Display Unit 151. And the directly associated words and the indirectly associated words are displayed in a list corresponding to the search box. For example, in the drop-down list box of the search box, the directly associated words are placed in the beginning of the list.

Display Transformation Unit 153, its function is: based on the dwell time of the directly associated words, the directly associated words placed in the beginning part of the list are transformed into the summary of the results relevant to the directly associated words.

In the embodiment, after the list of the directly associated words and indirectly associated words is displayed by the Display Transformation Unit 153, time measurement is triggered, in order to acquire the dwell time of the directly associated words. The dwell time is the time period when the directly associated words are shown in the list. During the dwell time, the directly associated words placed in the beginning part of the list are transformed into the summary of the results relevant to the directly associated words.

In the method for searching key words introduced above, most of the directly associated words include the most popular associated words which include the key words being searched. Because of this, it is of high possibility that the information which the user expects in the search is related the directly associated words. And through the dwell time, the user's intention can be detected, and then the directly associated words displayed are transformed into the summary of the results relevant to the directly associated words. The summary of the results relevant to the directly associated words is very likely to be the expected information. As a result, the expected information is provided in this intelligent way without any user's operation.

Figure 12:
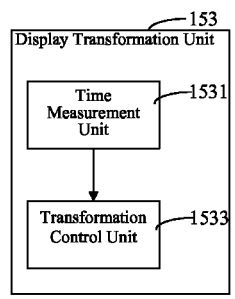
FIG. 12 is a structural diagram of the Display Transformation Unit of the FIG. 11.

As can be seen in the FIG. 12, in the embodiment, the Display Transformation Unit 153 above can be further divided into the following units: Time Measurement Unit 1531 and Transformation Control Unit 1533.

Time Measurement Unit 1531, its function is: time measurement is conducted through the display trigger of the list stated above in order to acquire the dwell time of the directly associated words.

In the embodiment, the directly associated words and the indirectly associated words are displayed in a list corresponding to the search box. And the time measurement is triggered by the Time Measurement Unit 1531. When any associated words in the list is selected, the selection operation stops the time measurement, in order to acquire the dwell time of the directly associated words.

Transformation Control Unit 5133, the function of which is to judge whether the dwell time mentioned above reaches the threshold of time. If the dwell time reaches the threshold of time, the directly associated words placed in the beginning part of the list are transformed into the summary of the results relevant to the directly associated words.

In the embodiment, the threshold of time can be preset. For instance, the threshold of time can be set as 1 second. The dwell time of the directly associated words usually increases as the time goes on. Therefore, if the increasing dwell time reaches the threshold of time, the directly associated words placed in the beginning part of the list are transformed into the summary of the results relevant to the directly associated words by the Transformation Control Unit 5133. If not, the time measurement goes on, until it reaches the threshold of time.

In another embodiment, the system for searching keywords has URL Return Module. Its function is to acquire the URLs of the webpages that include the summary of the results relevant to the directly associated words, and these URLs are sent back.

In the embodiment, after the summary of the results relevant to the directly associated words is acquired, the URLs of the webpages that include the summary of the results relevant to the directly associated words are also acquired. And then return.

Figure 13:
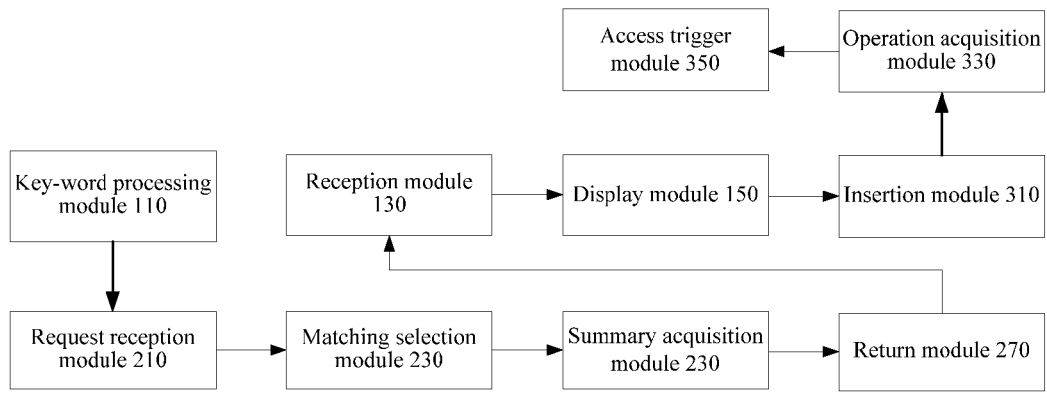
FIG. 13 is a structural diagram of the system for searching key words in another embodiment.

As can be seen in the FIG. 13, in the embodiment, the system for searching key words also includes the following modules URL Insertion Module 310, Operation Acquisition Module 330 and Access Trigger Module 350.

URL Insertion Module 310, its function is that the URLs of the webpages that include the summary of the results relevant to the directly associated words are inserted into the summary of the results displayed in the list.

Operation Acquisition Module 330, in this module, the selection operation the function of which is to acquire the summary of the results displayed in the list is performed.

Access Trigger Module 350, the function of which is: access events of visiting the webpages which include the summary of the results relevant to the directly associated words are triggered by the selection operation, and the webpages stated above are visited through the URLs mentioned above.

Figure 14:
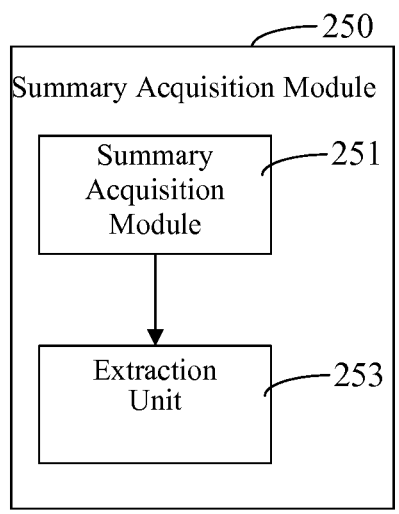
FIG. 14 is structural diagram of the Summary Acquisition Module of the FIG. 10.

As can be seen in the FIG. 14, in the embodiment, the Summary Acquisition Module 250 above includes the following units: Setting Information Acquisition Unit 251 and Extraction Unit 253.

The Setting Information Acquisition Unit 251, the function of the unit is that based on the information of the direction associated words, the corresponding setting information is acquired.

In the embodiment, considering the fact that the key words typed in might have an ambiguous semantic meaning and that further work needs to be done in order to acquire the accurate summary of the results relevant to the directly associated words, based on the directly associated words corresponding to the directly associated words, corresponding setting information is acquired by the Setting Information Acquisition Unit 251.

For instance, if the key word typed in is "weather", according to the matching, the direct associated words can be "weather report". Meanwhile, corresponding setting information is acquired. With regard to the area settings, this information is acquired at the first time by the Setting Information Acquisition Unit 251 when the user selects the area. And this information of area can be saved so as that when the key words with an ambiguous semantic meaning is typed in again, the saved information of area can be acquired directly.

Extraction Unit, it is used to extract the summary of the results relevant to the directly associated words and to the setting information.

In the embodiment, the summary of the results relevant to the directly associated words and to the setting information is extracted, so even when key words with an ambiguous semantic meaning are used, the accurate summary of the results relevant to the directly associated words can be found.

The method, device, and system for searching key words are disclosed. The device obtains a key word typed in the search box and send a search request based on the key words for searching. The associated words are identified based on the search request. The summary of the results relevant to the associated words mentioned previously is received by the device. The associated words and the summary of the results relevant to the associated words are respectively displayed in the list corresponding to the search box in the device. Thus, to get the expected information, there is no need for the user to click the associated words that are found based on the key words. And as can be seen from the work principle of the method and system, user's search intention can be detected accurately, and in the process of typing key words for searching, the user's expected information can be shown immediately. Thus, the search efficiency is improved.

It should be understood by those with ordinary skill in the art that all or some of the steps of the foregoing embodiments may be completed by hardware such as a computing device having a non-transitory storage medium accessible to a hardware processor. The embodiments may also be completed by hardware instructed by program, the program being stored in a non-transitory computer-readable storage medium. The non-transitory computer readable storage medium may include a read-only memory, a magnetic disk or a compact disk.

Disclosed above are only example embodiments of the present disclosure and these example embodiments are not intended to be limiting the scope of the present disclosure, hence any variations, modifications or replacements made without departing from the spirit of the present disclosure shall fall within the scope of the present disclosure.

What is claimed is:

1. A method for searching key words, comprising:
   obtaining, by a terminal device, a key word typed in a search box;
   sending, by the terminal device, a search request based on the obtained key word;
   obtaining, by the terminal device, a first set of directly associated words of the key word from a keyword database based on a matching between the search request and the keyword database, and obtaining a summary extracted from search results queried using the first set of directly associated words;
   obtaining, by the terminal device, a second set of indirectly associated words of the key word;
   displaying, by the terminal device as a list, the first set of directly associated words and the second set of indirectly associated words along with but below the first set of directly associated words in the search box;
   upon displaying the list, triggering a time measurement by the terminal device to acquire a user dwell time on the displayed first set of associated words;
   monitoring and determining that the user dwell time on the displayed directly associated words has reached a predetermined threshold user dwell time; and
   displaying, by the terminal device upon determining that the user dwell time has reached the predetermined threshold user dwell time, the summary extracted from the search results along with the displayed first set of associated words.

2. The method of claim 1, wherein the first set of directly associated words of the key word comprise word groups in the keyword database having at least one word matching the key word.

3. The method of claim 1, wherein the
   second set of indirectly associated words of the key word comprise words from the keyword database that are associated with but not direct match of the key word.

4. The method of claim 3, wherein the search results queried using the first set of directly associated words are obtained by searches performed by a server using the first set of directed associated words as search queries.

5. The method of claim 1, wherein after obtaining the summary extracted from the search results, the method further comprises:
   obtaining uniform resource locators (URLs) of webpages that comprises the search results queried using the directly associated words.

6. The method of claim 5, wherein after displaying the directly associated words and the summary extracted from the search results, the method further comprises:
   inserting the URLs of the webpages into the summary extracted from the search results;
   receiving a selection operation that selects the summary; and
   loading and displaying the webpages that comprise the search results after receiving the selection operation.

7. The method of claim 1, wherein obtaining the summary extracted from the search results comprises:
   obtaining corresponding setting information based on the directly associated words; and
   extracting the summary from the search results relevant to both the directly associated words and the setting information.

8. A system for searching key words, comprising:
one or more hardware processors; and
non-transitory storage medium accessible to the one or more hardware processors;
the non-transitory storage medium is configured to store instructions, wherein the instructions, when executed by the one or more hardware processors, are configured to cause the system to:
receive a key word typed in a search box and to send a search request based on the key word;
receive a first set of directly associated words of the key word from a keyword database and a summary extracted from search results queried using the first set of directly associated words;
receive a second set of indirectly associated words of the key word;
display, as a list, the first set of directly associated words and the second set of indirectly associated words along with but below the first set of directly associated words in the search box;
upon displaying the list, trigger a time measurement to acquire a user dwell time on the displayed first set of associated words;
monitor and determine that the user dwell time on the displayed directly associated words has reached a predetermined threshold user dwell time; and
display, upon determining that the user dwell time has reached the predetermined threshold user dwell time, the summary extracted from the search results along with the displayed first set of associated words.

9. The system of claim 8, wherein the first set of directly associated words comprises word groups in the keyword database having at least one word matching the key word.

10. The system of claim 8, wherein the second set of indirectly associated words of the key word comprises words from the keyword database that are associated with but not direct match of the key word.

11. The system of claim 10, wherein the search results queried using the first set of directly associated words are obtained by searches performed by a server using the first set of directed associated words as search queries.

12. The system of claim 8, wherein the instructions, when executed by the one or more hardware processors, are further configured to cause the system to:
acquire URLs of webpages comprising the search results queried using the directly associated words and return the URLs.

13. The system of claim 12, wherein the instructions, when executed by the one or more hardware processors, are further configured to cause the system to:
insert the URLs of the webpages comprising the search results relevant to the directly associated words into the summary extracted from the search results displayed in the list;
receive a selection operation that selects the summary; and
load and display the webpages that comprise the search results after receiving the selection operation.

14. The system of claim 8, wherein instructions, when executed by the one or more hardware processors to cause the system to acquire the summary extracted from the search results, are configured to cause the system to:
obtain a setting information based on the direction associated words; and
extract the summary from the search results relevant to both the directly associated words and the setting information.

15. A non-transitory storage medium configured to store instructions, the instructions, when executed by a processor of a terminal device, cause the terminal device to:
obtain a key word typed in a search box;
send a search request based on the obtained key word;
obtain a first set of directly associated words of the key word from a keyword database based on a matching between the search request and the keyword database, and obtaining a summary extracted from search results queried using the first set of directly associated words;
obtain a second set of indirectly associated words of the key word;
display as a list, the first set of directly associated words and the second set of indirectly associated words along with but below the first set of directly associated words in the search box;
upon displaying the list, trigger a time measurement by the terminal device to acquire a user dwell time on the displayed first set of associated words;
monitoring and determining that the user dwell time on the displayed directly associated words has reached a predetermined threshold user dwell time; and
displaying, upon determining that the user dwell time has reached the predetermined threshold user dwell time, the summary extracted from the search results along with the displayed first set of associated words.

16. The non-transitory storage medium of claim 15, wherein the first set of directly associated words of the key word comprise word groups in the keyword database having at least one word matching the key word and wherein the second set of indirectly associated words of the key word comprise words from the keyword database that are associated with but are not direct match of the key word.

17. The non-transitory storage medium of claim 16, wherein the search results queried using the first set of directly associated words are obtained by searches performed by a server using the first set of directed associated words as search queries.

* * * * *